(12) United States Patent
Bechstedt et al.

(10) Patent No.: US 10,684,617 B2
(45) Date of Patent: Jun. 16, 2020

(54) METHOD AND SUPERVISORY CONTROL DEVICE FOR MONITORING AN INSTALLATION

(71) Applicant: SIEMENS AKTIENGESELLSCHAFT, Munich (DE)

(72) Inventors: Ulrike Bechstedt, Feldkirchen-Westerham (DE); Yulia Kralina, Finsing (DE); Hans-Theo Neisius, Seukendorf (DE); Axel Platz, Munich (DE); Sonja Sander, Munich (DE); Christoffer Wittmann, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 264 days.

(21) Appl. No.: 15/314,131

(22) PCT Filed: May 28, 2014

(86) PCT No.: PCT/EP2014/061041
§ 371 (c)(1),
(2) Date: Nov. 28, 2016

(87) PCT Pub. No.: WO2015/180766
PCT Pub. Date: Dec. 3, 2015

(65) Prior Publication Data
US 2017/0192416 A1 Jul. 6, 2017

(51) Int. Cl.
*G05B 23/02* (2006.01)
*H02J 13/00* (2006.01)

(52) U.S. Cl.
CPC .... *G05B 23/0272* (2013.01); *H02J 13/00001* (2020.01); *G05B 2219/24088* (2013.01);
(Continued)

(58) Field of Classification Search
CPC ....... G05B 23/0267–0272; G05B 2219/23159; G05B 2219/24088; G05B 2219/24093;
(Continued)

(56) References Cited

U.S. PATENT DOCUMENTS

| 6,486,899 B1 | 11/2002 | Bush, Jr. |
| 7,499,816 B2 | 3/2009 | Scholtz et al. |

(Continued)

FOREIGN PATENT DOCUMENTS

| EP | 1895416 A1 | 3/2008 |
| EP | 2095482 B1 | 5/2011 |
| WO | 0233802 A1 | 4/2002 |

*Primary Examiner* — Todd Aguilera
(74) *Attorney, Agent, or Firm* — Laurence Greenberg; Werner Stemer; Ralph Locher

(57) ABSTRACT

A method for monitoring an installation having a networked topology, wherein measured values characterizing a state of the installation at the measuring point in question are captured and transmitted to a control-center apparatus, which determines state values indicating a state of the installation. The state values are used to show the state of the installation and they are compared with state threshold values that bound an operating range of the installation. A graphical representation is produced only for those state values for which a past or imminent violation of the associated state threshold value is detected. A visual display of a network topology is displayed on a display. Location information indicating the position of the state value in question in the installation is associated with each of the state values, and each representation is displayed at the point corresponding to the position of the representation in the installation.

11 Claims, 5 Drawing Sheets

(52) U.S. Cl.
CPC .............. *G05B 2219/24093* (2013.01); *G05B 2219/25022* (2013.01); *Y02E 60/74* (2013.01); *Y04S 10/30* (2013.01); *Y04S 10/40* (2013.01); *Y04S 10/522* (2013.01)

(58) Field of Classification Search
CPC .......... G05B 2219/25022; H02J 13/001; H02J 13/00001; Y04S 10/30–527; Y02E 60/74; G06Q 10/063–06398; G06F 11/32–328
USPC .................. 702/58–62, 185, 188; 700/9, 286
See application file for complete search history.

(56) References Cited

U.S. PATENT DOCUMENTS

| | | | | |
|---|---|---|---|---|
| 7,933,828 B2* | 4/2011 | Bandman | ............... | G06Q 30/08 705/35 |
| 8,463,899 B2* | 6/2013 | Scarpelli | ............. | G06F 11/0709 709/224 |
| 8,665,101 B2* | 3/2014 | Solomon | ................ | G01M 3/243 340/605 |
| 8,674,843 B2* | 3/2014 | Bhageria | ............... | H02J 13/001 340/635 |
| 9,697,067 B2* | 7/2017 | Nakajima | ........... | G06F 11/0709 |
| 2004/0021687 A1 | 2/2004 | Wobben | | |
| 2006/0238364 A1 | 10/2006 | Keefe et al. | | |
| 2007/0027788 A1* | 2/2007 | Bandman | ............... | G06Q 30/08 705/36 R |
| 2009/0030556 A1 | 1/2009 | Castelli et al. | | |
| 2010/0050023 A1* | 2/2010 | Scarpelli | ............. | G06F 11/0709 714/46 |
| 2012/0007743 A1* | 1/2012 | Solomon | ............... | G01M 3/243 340/605 |
| 2013/0063272 A1* | 3/2013 | Bhageria | ............... | H02J 13/001 340/650 |
| 2013/0212491 A1* | 8/2013 | Yerli | ....................... | H04L 51/32 715/753 |
| 2015/0370625 A1* | 12/2015 | Nakajima | ........... | G06F 11/0709 714/37 |

* cited by examiner

METHOD AND SUPERVISORY CONTROL DEVICE FOR MONITORING AN INSTALLATION

BACKGROUND OF THE INVENTION

Field of the Invention

The invention relates to a method for monitoring an installation having a networked topology, in which a plurality of measuring points in the installation are used to capture measured values characterizing a state of the installation at the respective measuring point, the captured measured values are transmitted to a supervisory control device that uses the measured values to ascertain state values that indicate a state at prescribed state observation points of the installation, and the state values are used to produce a visual display of the state of the installation. The invention also relates to a supervisory control device that is used to perform such a method.

Such a method is known for an installation in the form of an electrical power supply system, for example from European Patent Specification EP 2095482 B1.

In order to ensure smooth and safe operation of installations, such as e.g. electrical power supply systems, measured values for the installation that are characteristic of the state of the installation are monitored in what are known as system control centers in order to ascertain whether the installation is in an intended operating state or else a critical state. In this case, the installations may be regarded, in principle, as any installation having networked topology, such as electrical power supply systems, pneumatic networks (e.g. gas distribution networks, air distribution networks), hydraulic networks (e.g. water distribution networks, oil distribution networks), data networks, information networks and communication networks or transport networks (e.g. highways, rail networks), for example.

The explanations and exemplary embodiments provided below relate merely by way of example to an installation in the form of an electrical power distribution network, but they can, in all respects, also be transferred to other network types. Instead of the measured values relevant to a power supply system, such as e.g. currents and voltages, corresponding measured values, such as e.g. flow rates, pressures, temperatures, communication utilization levels (bandwidth used) and traffic densities and streams, are used in these cases.

To identify an operating state of an installation in the form of an electrical power supply system, selected measuring points of the electrical power supply system are used to capture measured values for electrical measured variables, such as e.g. current, voltage, power and frequency, by means of suitable converters and to supply them, usually in digital form, to the system control center for evaluation and observation. In order to ensure a temporal reference for the individual measured values in relation to one another, the recorded measured values can be augmented by what are known as timestamps, that is to say time-of-day information data, that indicate e.g. that time of day at which the measured values have been captured. Such timestamps can be allocated with an accuracy of one millisecond, for example.

Since the number of measuring points to be provided in a power supply system is limited particularly from the point of view of cost, a supervisory control device in the system control center uses the measured values from the available measuring points to ascertain an almost comprehensive system state. As the result of this ascertainment, state values for prescribed observation points of the power supply system are available that describe a present and/or expected state of the power supply system at the observation points. In this case, the observation points may be identical to the measuring points, for example, or may even form a subset thereof (overdefined system, e.g. power transmission system). In this case, the captured measured values may possibly be adopted directly as state values for the individual observation points. However, it may also arise that the number of observation points is larger than the number of measuring points that are actually present in the power supply system. In this situation, in the extreme case, all points of the power supply system may be prescribed as observation points, in which case the system state would be described by corresponding state values practically at any desired point of the power supply system. By way of example, the observation points selected can be particular critical points in the power supply system, e.g. individual busbars, transformer stations, power outlets, etc., at which the state of the power supply system is monitored. From the state values, the supervisory control device then generates a visual display that is displayed to the operating personnel of the power supply system. In this case, the visual display may be embodied in table form or in diagram form for example.

On account of the large number of pieces of information presented, the operating personnel in a system control center have great difficulty in maintaining a reliable overview of the actual system state and being able to make a well-founded and differentiated statement about the present stability of the electrical power supply system.

BRIEF SUMMARY OF THE INVENTION

Therefore, the invention is based on the object of specifying a method for monitoring an installation in which, particularly when there are a large number of measuring points to be monitored in the installation, a statement about an operating state and a stability of the whole installation can be provided in a simple manner. The invention is also based on the object of specifying a corresponding supervisory control device for performing such a method.

To achieve this object, the invention proposes a method of the type cited at the outset in which the supervisory control device provides state threshold values for at least selected instances of the state observation points, which state threshold values delimit an admissible operating area for the installation at the respective state observation point. The state values ascertained for the selected state observation points are compared with the associated state threshold values, and, exclusively for those state values for which a violation of the associated state threshold value that has already taken place or is imminent is identified, the supervisory control device produces a graphical representation. The supervisory control device is also used to produce a visual display of a network topology of the installation and to display it by means of a display device. At least the state values for which a representation is produced are each assigned a piece of location information indicating the position of their respective state observation point in the installation, and the respective graphical representation is presented, using the location information, at that respective point of the displayed network topology that corresponds to its position in the installation.

The particular advantage of the method according to the invention is that a visual presentation that indicates the topology of the installation and that may be a functional or geographical system plan, for example, is used to display to the operating personnel exclusively those system states that indicate a critical operating state—which is imminent or has already taken place—of the installation. Since the display in the form of the graphical representation displays not only the fact that there is a critical state but also the position thereof in the installation, the operating personnel can very quickly and intuitively grasp the state of the installation and, if need be, take countermeasures in order to contain a critical system state. In this case, it is also regarded as advantageous if the network topology is presented in restrained coloration (e.g. in grayscale) so as not to divert the attention of the operating personnel from the presentation of the graphical representations indicating the critical states.

Threshold value violations and prospective threshold value violations can thus be easily identified and displayed to the operating personnel. In this case, the displayed information is focused onto the actually critical points, so that a fast and easily comprehensible presentation can be produced for the operating personnel. In this case, the focusing of the information consists particularly of limiting to actually relevant information such as the highlighting or emphasis of topological information (e.g. lines, data cables, arterial roads) that have a reference to the relevant system section. Furthermore, it is also possible to indicate a presentation of numerical values (e.g. level of the threshold value violation in percent). The display can moreover also be manually filtered further by selecting the type of information (e.g. active power, reactive power, voltage level, pressure level, system area, criticality of the threshold value violation—e.g. more than 20% above the threshold value), in order to achieve even greater compression of the relevant information.

The time from which a state value can be identified as one that indicates an imminent threshold value violation can be prescribed in the configuration of the supervisory control device as a parameter setting. By way of example, an approach to within 10% of the respective state threshold value can be regarded as an imminent threshold value violation; other settings are likewise possible, however. It is also possible to make different settings for different state variables and/or observation points.

Specifically, according to one advantageous embodiment of the method according to the invention, there may be provision for the installation to be an electrical power supply system, or a pneumatic network, particularly a gas or air distribution network, or a hydraulic network, particularly a water or oil distribution network, or a data network or an information network or a communication network or a transport network, particularly a road transport network or a rail network.

One advantageous embodiment of the method according to the invention provides for the state values to be formed directly from the measured values (use of the realtime values e.g. in the case of the SCADA) or to be ascertained by carrying out a state estimation method, a load flow computation method, a load flow forecast method or a combination of these methods.

In this case, the observation points may be identical to the measuring points, for example, or may even form a subset thereof. In this case, the captured measured values can, if need be, be adopted directly as state values for the individual observation points (SCADA).

By using further methods (state estimation, load flow computation, load flow forecast, etc.), it is possible for the state values to be ascertained particularly reliably. To this end, by way of example, state estimation methods and/or load flow computations take place using mathematical model descriptions that emulate the installation, e.g. a power supply system, as accurately as possible. This involves variables that influence the measured values and the network topology, such as e.g. positions of switches, valves, selectors and transformer tap changers, being used as input variables in real time. In addition, load forecasts, load flow optimizations, failure variant computations and/or short-circuit current computations can also find their way into the ascertainment of the state values.

According to a further advantageous embodiment of the method according to the invention, there is provision for a graphical representation having a circular base area, the diameter of which is dependent on the magnitude of the respective state value in comparison with the associated state threshold value, to be produced.

The diameter of a circular graphical representation of this kind therefore increases—from the area set as a threshold value approach—as the value of the underlying state value rises, so that it is possible to distinguish, e.g. at one glance, an imminent threshold value violation from one that has already taken place or to identify the most critical threshold value violation (from the largest diameter of the graphical representation). In this case, the magnitude of the base area can be influenced, for example linearly. However, there may also be provision for magnitude influencing to occur only as a result of a threshold value violation having taken place. In this case, the circular base areas of the graphical representations initially have a defined radius so that the display is generally easily visible. The radius is increased only in the event of a threshold value violation, in order to display the degree of severity of the violation.

In this context, there may also be provision for the value of the respective state threshold value to be indicated by the graphical representation.

This can be effected e.g. as a numerical display in the area of the graphical representation. A particular preference in this case, however, is a presentation in which the threshold value is graphically integrated into the representation, e.g. by being highlighted in the graphical representation in the form of a circumference with the relevant diameter.

According to a further advantageous embodiment of the method according to the invention, there may further be provision for the graphical representation to be displayed in the form of a three-dimensional body when the threshold value violation has taken place.

It is therefore an even simpler matter—namely by distinguishing between two-dimensional and three-dimensional presentations of the graphical representation—to display a threshold value violation. When the graphical representation is displayed three-dimensionally, it is also a possibility for the network topology to be presented not in plan view but rather in a spatial view, e.g. from an angle of vision in an obliquely elevated position, so that the three-dimensional bodies can be inserted into the presentation of the network topology better.

In this context, there may additionally also be advantageous provision for the graphical representation also to display the direction of the threshold value violation. This can be effected in the case of a three-dimensional body by virtue of the body having its base area situated in the plane of the network topology presentation and its height axis extending either upward (when an upper limit value is exceeded) or downward (when there is a drop below a limit value for a lower limit value, for example). In this way, it is also possible to indicate the violation of such threshold values as define an upwardly and downwardly limited operating area of the installation (for example compliance with a prescribed voltage band or a pressure range) in a differentiated manner.

Furthermore, in this context, according to a further advantageous embodiment of the method according to the invention, there is provision for the length of a height axis of the graphical representation to be dependent on the magnitude of the respective state value in comparison with the associated state threshold value.

In this case, the severity of the threshold value violation is therefore indicated by the height of the graphical representation as it were.

According to a further advantageous embodiment of the method according to the invention, there may additionally be provision for a coloration and/or a transparency of the graphical representation to be dependent on the magnitude of the respective state value in comparison with the associated state threshold value and/or on an association of the graphical representation with a particular group (e.g. installation parts having the same voltage or pressure level) of the respective associated observation point in the installation.

This allows further information about the system state to be transmitted to the operating personnel in an intuitive manner solely by virtue of different embodiments of the visual presentation (color, transparency) of the graphical representation.

According to a further advantageous embodiment of the method according to the invention, there may finally be provision for e.g. a state estimation method, a load flow computation and/or a load flow forecast to be used to also ascertain reserve values that indicate a control reserve in the installation, and for the value from the reserve values to be presented by taking account of its position in the installation, together with the network topology.

Specifically, in the case of an installation in the form of an electrical power supply system, for example, the reserve values can then indicate an inductive and/or capacitive control reserve.

In this way, the operating personnel of the system control center are not only able to have the (imminent) threshold value violation as such displayed to them, it is also possible, through the display of control reserves, which comprise inductive or capacitive control reserves (e.g. the magnitude of the capacitance of a connectable capacitor bank or of a connectable inductive mains filter) in the case of a power supply system, to show ways of containing a critical situation. As these control reserves are likewise displayed at the (geographically and/or functionally) correct point in the system topology presentation, it is additionally possible to display a prioritization for possible countermeasures by virtue of the physical proximity of particular control reserves to an observation point with a critical system state.

The aforementioned object is additionally also achieved by a supervisory control device for monitoring an installation having a networked topology, having a measuring input device that is set up to capture measured values that characterize a state of the installation at different measuring points, a state computation device that is set up to ascertain state values on the basis of the measured values, wherein the state values indicate an electrical state at prescribed state observation points of the installation, and a display device that is set up to visually display the state of the installation.

According to the invention, there is provision for the supervisory control device to comprise an evaluation device that is set up to carry out a method as claimed. In respect of the supervisory control device according to the invention, all comments made above and below in relation to the method according to the invention apply in a corresponding manner, and vice versa, in particular the supervisory control device according to the invention is set up to perform the method according to the invention in any desired embodiment or a combination of any embodiments. Reference is also made to the advantages described in relation to the method according to the invention for the advantages of the device according to the invention.

The invention is explained in more detail below on the basis of an exemplary embodiment. The specific embodiment of the exemplary embodiment is by no means intended to be understood as restrictive for the general embodiment of the method according to the invention and the supervisory control device according to the invention; instead, individual embodiment features of the exemplary embodiment can be combined freely with one another and with the features described above in any manner. As already mentioned above, the exemplary embodiments below relate by way of example to an installation in the form of a power supply system. The comments can also be applied to other installations having a networked topology, however.

DESCRIPTION OF THE INVENTION

Figure 1:
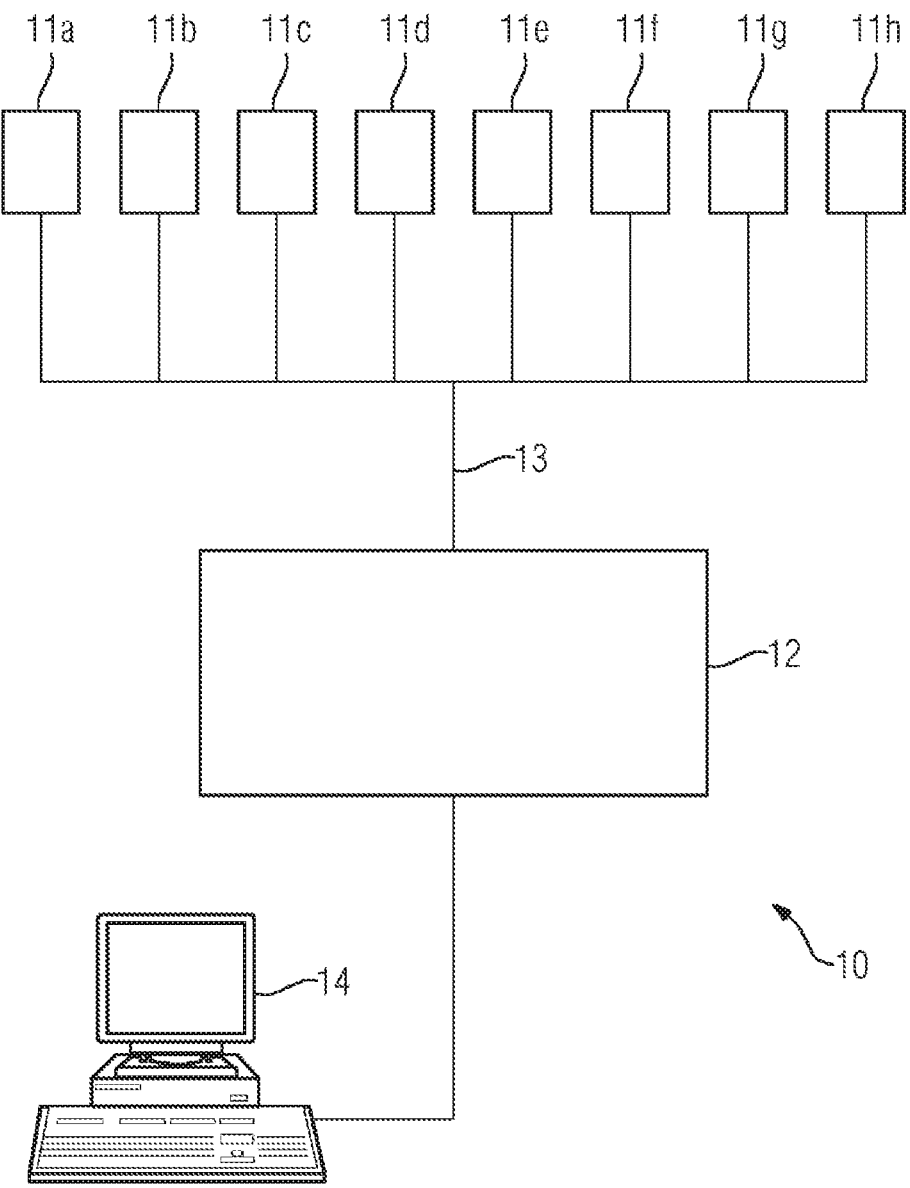
FIG. 1 shows a schematic view of a system having a supervisory control device for monitoring an electrical power supply system.

FIG. 1 shows a monitoring system 10 for an electrical power supply system, itself not shown for reasons of clarity. In this case, different measuring points of the electrical power supply system have measuring devices 11a to 11h arranged at them that can be used to record measured values that characterize a state of the electrical power supply system at the respective measuring point. This does not imperatively require each measuring device to be arranged at a different measuring point of the electrical power supply system, however; instead, it is also possible for two measuring devices, for example the measuring devices 11a and 11b, to be arranged at the same measuring point and to capture different measured values, for example firstly the current and secondly the voltage, thereat and to output corresponding measured values. Other measured variables that are capturable using the measuring devices and are characteristic of the status of the power supply system may be a power, a frequency or a temperature, for example.

In this case, the measuring devices 11a to 11h can themselves perform preprocessing for the measured values, for example by virtue of the measured values being filtered and subjected to analog-digital conversion. Analog-digital conversion of this kind usually entails a digital timestamp also being associated with the relevant digitized measured values, that is to say a piece of information that indicates a time of day characteristic of the individual measured value (for example the time of day for the time of capture of the respective measured value). Alternatively, the measuring devices 11a to 11h can also output their measured values in analog form, for example, so that corresponding preprocessing does not take place until in a later step.

The measuring devices 11a to 11h may be e.g. individual converter devices and sensors or may be measuring instruments combining multiple measuring channels, such as e.g. what are known as remote terminal units (RTUs) or merging units (MUs). However, they may also be phasor measuring devices or phasor measurement units (PMUs), for example, which are set up to capture phasor variables in electrical power supply systems. By way of example, phasor measuring devices having a high sampling rate can be used to measure current phasor measured values and voltage phasor measured values that contain a piece of information about the amplitude and phase angle of the current or voltage at the respective time of capture.

The number of measuring devices is naturally not, as FIG. 1 shows merely by way of example, limited to eight, but rather the method described below is suitable for monitoring an electrical power supply system when there are arbitrary numbers of measuring devices.

The measuring devices 11a to 11h are connected via a communication medium 13, for example via a communication network or a communication bus, to a supervisory control device 12, which may be a specifically set-up data processing device in a system control center for monitoring the electrical power supply system, for example.

The communication medium 13 may, as shown in FIG. 1, be set up for direct connection of the measuring devices 11a to 11h to the supervisory control device 12. However, within the context of the invention, it is entirely also possible to use a communication medium having multiple levels and interposed devices capable of communication. Such devices capable of communication may be electrical protective or control devices in a substation of the power supply system or specific communication devices, such as e.g. switches or hubs, in a data communication network, for example.

The supervisory control device 12 is used to ascertain the state of the whole power supply system on the basis of the measured values received from the measuring devices 11a-11h, which measured values indicate the system state just at some measuring points of the power supply system. To this end, state values are computed for prescribed observation points, said state values indicating the state of the power supply system at the observation points. This can be effected by carrying out a state estimation method, a load flow computation method, a load flow forecast method or a combination of these methods, for example. By using such methods, it is possible for the state values to be ascertained particularly reliably. To this end, by way of example, state estimation methods and/or load flow computations using mathematical model descriptions that emulate the power supply system as accurately as possible take place. This involves variables that influence the measured values and the network topology, such as positions of switches and transformer tap changers, being used as input variables in real time. In addition, load forecasts, load flow optimizations, failure variant computations and/or short-circuit current computations can also find their way into the ascertainment of the state values. However, the observation points may also be identical to the measuring points or even form a subset thereof, for example. In this case, the captured measured values can, if need be, be directly adopted as state values for the individual observation points.

As the result of this ascertainment, state values for the prescribed state observation points (subsequently also called "observation points" for short) of the power supply system are available that describe a present and/or expected state of the power supply system at the observation points. Usually, the number of observation points will be larger than the number of measuring points that are actually present in the power supply system. In this situation, in the extreme case, all points of the power supply system may be prescribed as observation points, in which case the system state would be described by corresponding state values practically at any desired point of the power supply system. Usually, however, the observation points selected are particular critical points in the power supply system, e.g. individual busbars, transformer stations, power outlets, etc., at which the state of the power supply system is monitored.

From the state values, the supervisory control device 12 then uses an evaluation device, which is not shown explicitly in FIG. 1, to generate a visual display that is displayed to the operating personnel of the power supply system by means of a display device 14, which may be a monitor of the supervisory control device, may be a separate data processing device, such as e.g. a workstation, or may be specific large-area displays designed for system control centers.

Essential information for the operating personnel when presenting the system state, for example threshold value violations in the voltage band (voltage violations), is as follows, for example:
- a (geographical) position of a critical state in the power supply system;
- has a threshold value already being exceeded (yes/no)?
- which threshold value has been exceeded?
- has an upper threshold value (e.g. high voltage violation) or a lower threshold value (e.g. low voltage violation) been infringed?
- degree of severity of the violation (how large is the discrepancy from the nominal value?)
- on what voltage level has a violation taken place?

In order to provide the operating personnel with as clear and intuitively comprehensible display of the system state as possible overall, the evaluation device of the supervisory control device 12 provides state threshold values for at least selected instances of the observation points, which state threshold values delimit an admissible operating area of the power supply system at the respective state observation point. The state values ascertained for the selected state observation points are compared with the associated state threshold values. The supervisory control device 12 then produces a graphical representation exclusively for those state values for which a violation of the associated state threshold value that has already taken place or that is imminent is identified.

The time from which a state value can be identified as one that indicates an imminent threshold value violation can be prescribed in the configuration of the supervisory control device 12 as a parameter setting. By way of example, an approach to within 10% of the respective state threshold value can be regarded as an imminent threshold value violation; other settings are likewise possible, however. It is also possible to make different settings for different state variables and/or observation points.

The supervisory control device 12 is also used to produce a visual display of a network topology of the power supply system, which may be a functional or geographical system plan, for example, and to display it by means of the display device 14.

At least those state values for which a graphical representation is produced are assigned a respective piece of location information that indicates the position of their respective state observation point in the power supply system, and the respective graphical representation is presented, using the location information, at that respective point of the displayed network topology that corresponds to its position in the power supply system.

Figure 2:
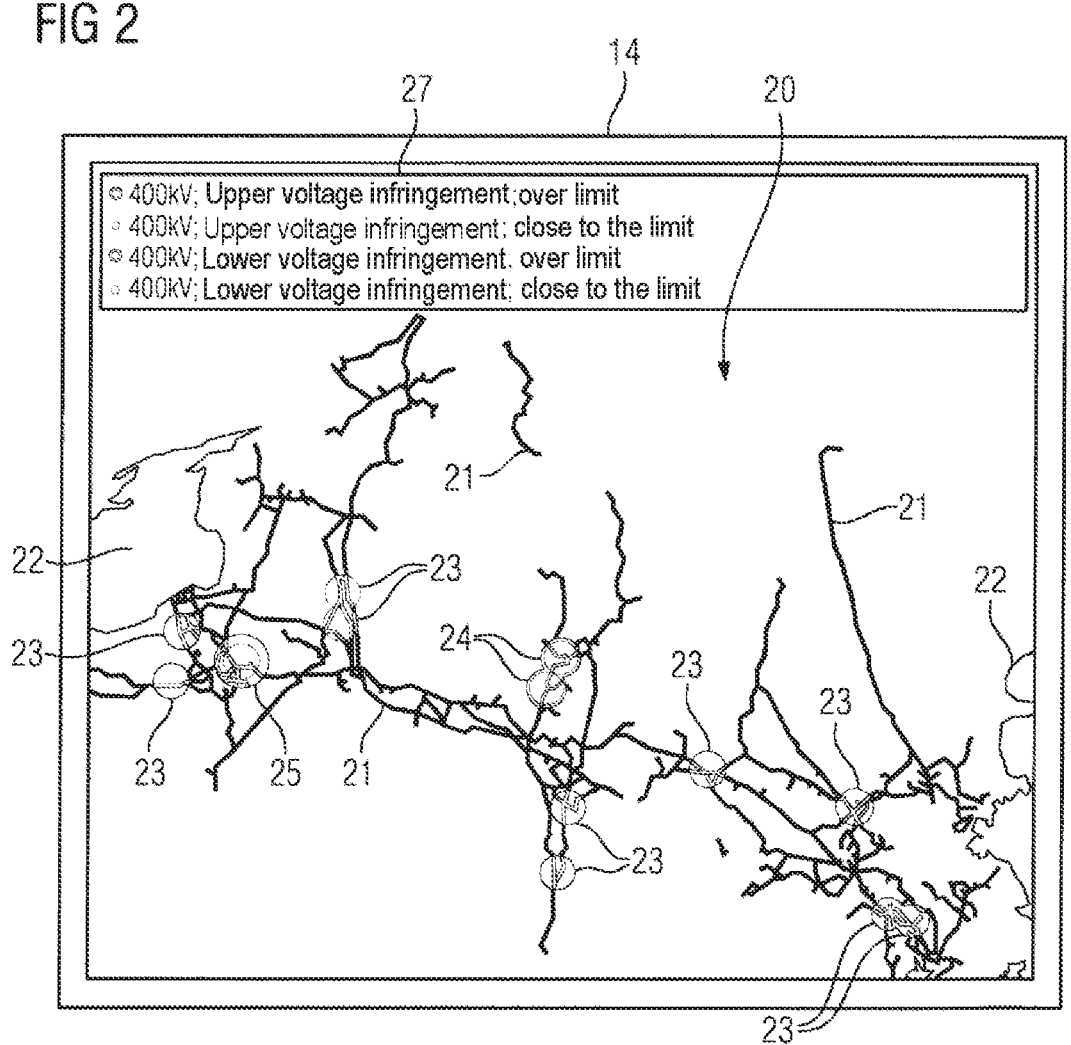
FIG. 2 shows a first exemplary embodiment of a visual display of a state of a power supply system with graphical representations of critical system states in a two-dimensional presentation.

In this context, FIG. 2 shows a first example of a visual display of the state of the power supply system as presented by means of the display device 14.

A main display area 20 is used in this case to show, by way of example, a network topology in the form of a geographically structured system plan with power supply lines 21 of the power supply system. The network topology indicates not only a geographical profile of the power supply lines 21 but also (electrical) connections of the power supply lines by nodes. To assist the geographical orientation, it is furthermore also possible for essential features of the scenery, such as e.g. bodies of water 22, the profile of main transport routes (e.g. highways, railway lines) or city limits, to be displayed to the operating personnel.

In addition to the display of the network topology, the display device 14 is also used to present graphical representations 23, 24, 25 that indicate the critical states in the power supply system at the relevant observation points. Critical states indicate states of the power supply system that are outside its desired operating area, and may be provided by voltages and/or frequencies that are outside a prescribed voltage or frequency band, excessive currents and/or temperatures or power differences, for example.

The particular advantage of this form of the visual display is that a visual presentation indicating the topology of the power supply system is used to display to the operating personnel exclusively those system states that indicate a critical operating state—which is imminent or has already taken place—of the power supply system. Since the display in the form of the graphical representation displays not only the fact that there is a critical state but also the position thereof in the power supply system, the operating personnel can very quickly and intuitively grasp the state of the power supply system and, if need be, take measures in order to contain a critical system state. In this case, the visualization of the graphical representation may either be integrated directly into the level of the network topology or overlay it as a separate level ("layer"). When graphical levels are used, there may additionally be provision for multiple superimposed levels to be able to be used to display the state variables and/or threshold value approaches and violations. In this case, information of different type can also be assigned to different levels. If required, it may be possible for different levels to be adapted and/or shown or hidden by the operating personnel, so that relationships, coincidences and correlations can be rendered visible in a simple manner. In this case, it is also regarded as advantageous if the network topology is presented in restrained coloration (e.g. in grayscale) so as not to divert the attention of the operating personnel from the presentation of the graphical representations indicating the critical states. Optionally, the degree of restrained presentation can be varied by the user (e.g. gradual or seamless adjustment of a transition from grayscale to a color presentation).

The threshold value violations and prospective threshold value violations can thus be easily identified and displayed to the operating personnel. In this case, the displayed information is focused onto the actually critical points, so that a fast and easily comprehensible presentation can be produced for the operating personnel. In this case, the focusing of the information consists particularly of limiting to actually relevant information such as the highlighting or emphasis of topological information (e.g. lines) that have a reference to the relevant system section. Furthermore, it is also possible to indicate a presentation of numerical values (e.g. level of the threshold value violation in percent). The display can moreover also be manually filtered further by selecting the type of information (e.g. active power, reactive power, voltage level, system area, criticality of the threshold value violation—e.g. more than 20% above the threshold value), in order to achieve even greater compression of the relevant information.

The graphical representations 23, 24, 25 are presented, in accordance with the example in FIG. 2, as two-dimensional objects having a circular base area, together with a plan view of the network topology. They particularly allow conclusions as to the following information:

The (geographical and/or functional) point in the power supply system at which there is a critical state is indicated. This information is provided by the position of the graphical representation in relation to the presentation of the network topology, which is position is produced by means of the location information.

The magnitude of the state value on which the graphical representation is based influences the diameter of the circular base area of the graphical representation. By way of example, this makes it possible to identify that the graphical representation 25 indicates the most critical point in the power supply system shown in FIG. 2. In this case, the magnitude of the base area can be influenced linearly, for example. However, there may also be provision for magnitude influencing to occur only as a result of a threshold value violation having taken place. In this case, the circular base areas of the graphical representations initially have a defined radius so that the display is generally easily visible. The radius is increased only in the event of a threshold value violation, in order to display the degree of severity of the violation.

Figure 3:
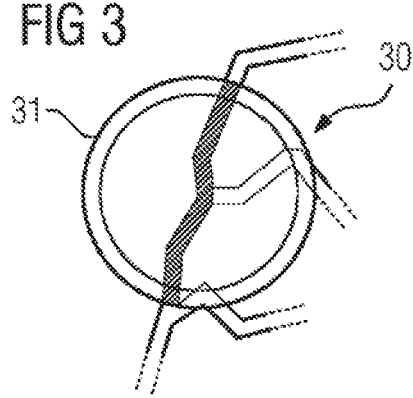
FIGS. 3-8 show various exemplary embodiments of graphical representations in a two-dimensional presentation.
Figure 4:
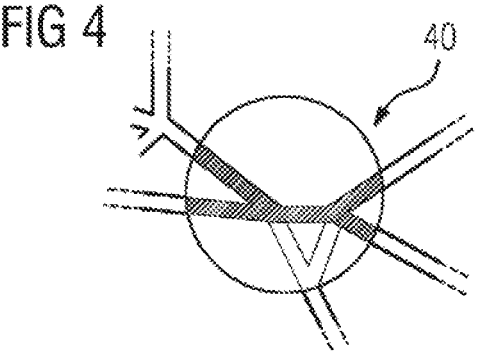
Figure 5:
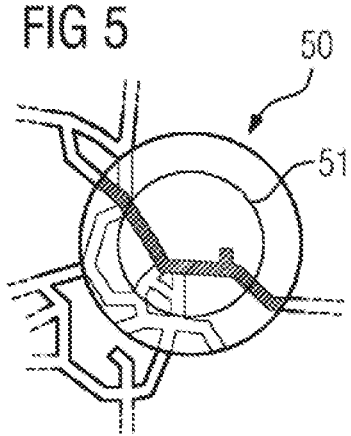

In addition, it is possible to display whether a state threshold value has already been exceeded. This information can be provided by the simultaneous graphical display of the threshold value, for example by a ring in the graphical representation with that diameter that corresponds to the value of the state threshold value. This is clarified in FIGS. 3, 4 and 5. In this case, FIG. 3 shows a detail from a network topology with a graphical representation 30 in which the state threshold value is displayed in the form of a ring 31 with a corresponding diameter. As can easily be seen from FIG. 3, the state threshold value indicated by the ring 31 has already been exceeded (in a similar manner to the graphical representations 24 in FIG. 2). By contrast, FIG. 4 shows a detail from a network topology with a graphical representation 40 in which the state threshold value has not yet been exceeded (in a similar manner to the graphical representations 23 in FIG. 2). In the example of FIG. 4, the state threshold value is also not displayed in the graphical representation in this case. Alternatively, however, it would also be possible for a display in accordance with the example of FIG. 3 to be provided, but in this case the diameter of the portion of the graphical representation that indicates the state value (circle) would have to be smaller than the diameter of the ring indicating the state threshold value. FIG. 5 shows a detail from a network topology with a graphical representation 50 in which the state threshold value is indicated in the form of a ring 51 with a corresponding diameter. As can be easily gleaned from FIG. 5 in comparison with FIG. 3, the state threshold value indicated by the ring 51 has already been exceeded, the exceeding having assumed a greater extent than the exceeding indicated in FIG. 3 (in a similar manner to the graphical representation 25 in FIG. 2).

Further pointers to the criticality of a state can furthermore also be provided by a coloration and/or a transparency of the presentation of the graphical representation. Furthermore, different coloration of the graphical representations can point to the association with particular voltage levels (e.g. 400 kV, 240 kV, 120 kV), for example. Graduations in the coloration can additionally point to the severity of the (imminent) exceeding of the threshold value and (in the case of permitted ranges of the state variable that are delimited by an upper and a lower threshold value) to the direction of the violation (exceeding of an upper threshold value or drop below a lower threshold value).

For the case of color coding of the graphical representations, there may generally be a legend provided in an information presentation area 27 of the visual display (cf. FIG. 2).

Figure 6:
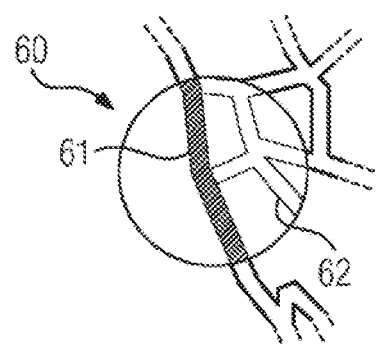

In addition, by highlighting the lines affected by the critical state, it is also possible to provide pointers to the cause of a critical state. In this regard, FIG. 6 shows a detail from a network topology with a graphical representation 60, for example. In addition, a power supply line 61 is marked visually as affected by the critical state, while other power supply lines 62 are not marked visually, since they are not affected by the critical state. This allows the search for the cause of the critical state to be facilitated.

Figure 7:
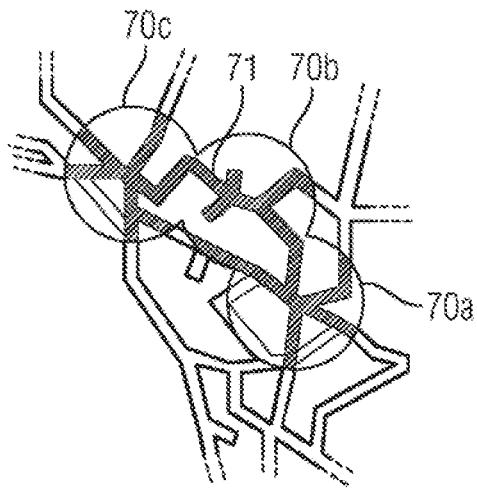
Figure 8:
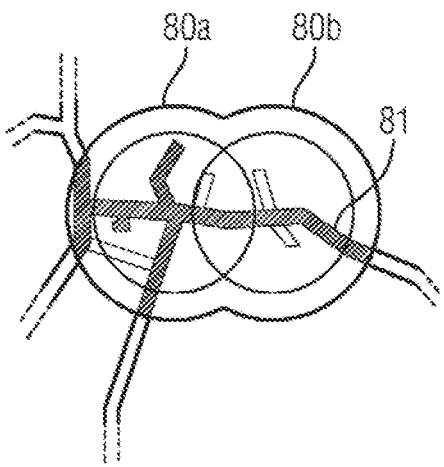

As can be gleaned from FIGS. 7 and 8, the graphical representations can also be superimposed or overlap and hence form new forms. This visual accumulation provides the operating personnel with an even bigger pointer to the fact that a larger section of the power supply system has problems. In this regard, FIG. 7 shows three superimposed graphical representations 70*a*-*c* that indicate an imminent threshold value violation along a power supply line 71. FIG. 8 shows two superimposed graphical representations 80*a*-*b* that indicate a threshold value violation that has already taken place along a power supply line 81.

Figure 9:
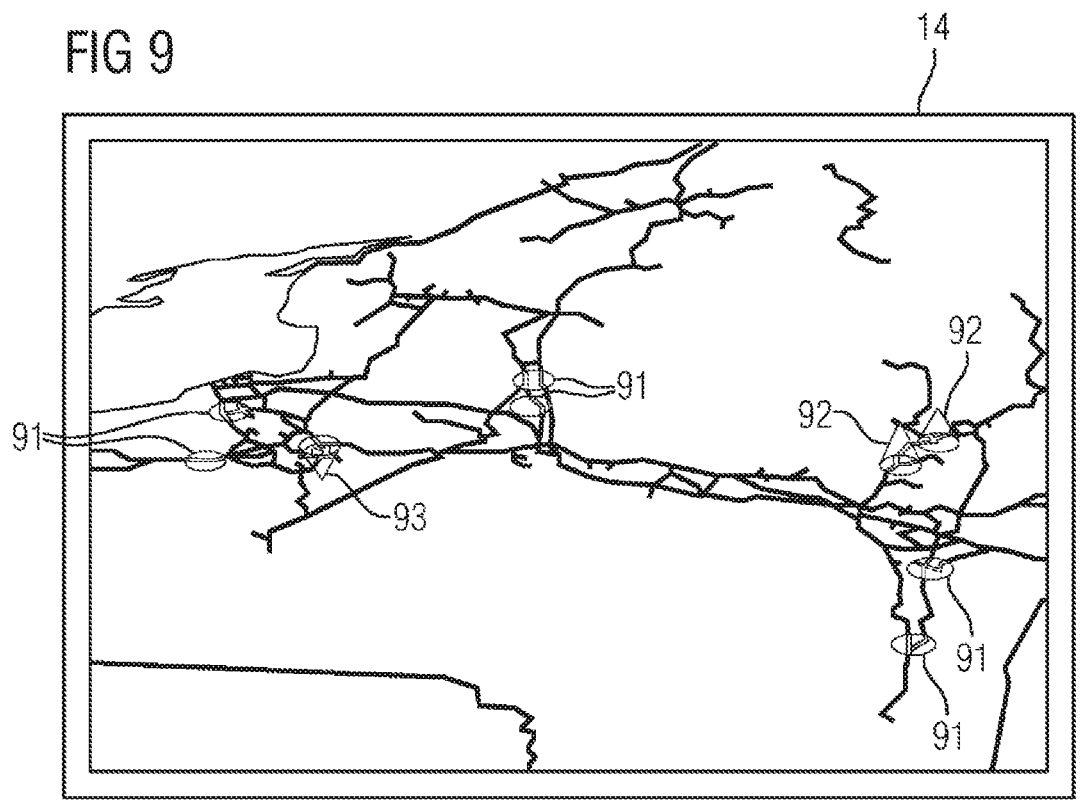
FIG. 9 shows a second exemplary embodiment of a visual display of a state of a power supply system with graphical representations of critical system states in a three-dimensional presentation.

FIG. 9 shows a second exemplary embodiment of a visual display of the state of the power supply system with the display device 14. The essential difference from the presentation shown in FIG. 2 is that a three-dimensional presentation has now been chosen for the visual display. In this case, the network topology is displayed in a spatial manner from an angle of vision in an obliquely elevated position. In this case, the graphical representations 91, 92, 93 indicate critical system states at the associated positions in the power supply system. The furthermore two-dimensionally displayed graphical representations 91 are in this case network states for which a threshold value violation has not yet taken place, but one is imminent. In this case, the—in plan view—circular base area of the graphical representations 91 has been changed to an elliptical shape for the purpose of better insertion into the spatial view shown in FIG. 9.

Figure 10:
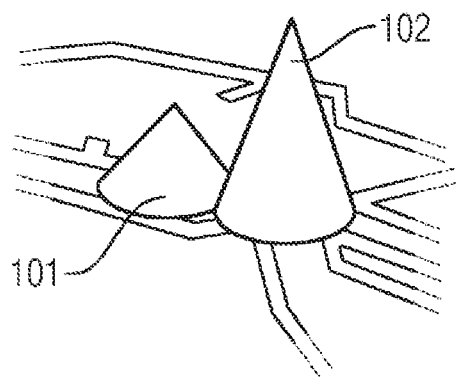
FIGS. 10-11 show various exemplary embodiments of graphical representations in a three-dimensional presentation.
Figure 11:
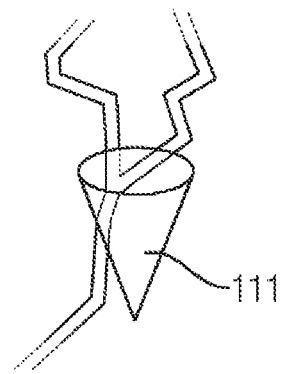

The graphical representations 92 and 93 are presented as three-dimensional bodies (in this case specifically as cones), on the other hand. Their upward and downward orientation as seen from the level of the network topology indicates a violation of an upper (cf. also graphical representations 101 and 102 in FIG. 10) and a lower (cf. also graphical representation 111 in FIG. 11) threshold value. As can furthermore easily be gleaned from FIG. 10, the length of the height axis of the respective graphical representation displayed as a three-dimensional body can also indicate a magnitude of the underlying state value or a criticality of the threshold value violation. Thus, in FIG. 10, a graphical representation 101 with a small height axis indicates a smaller threshold value violation than a graphical representation 102 with a comparatively larger height axis.

Different colorations of the graphical representations 91, 92, 93 can furthermore indicate the voltage levels.

The operating personnel may optionally have the opportunity to influence a relevant setting of the supervisory control device 12 in order to change over between the two-dimensional and three-dimensional display and, if need be, also to alter the angle of vision.

Figure 12:
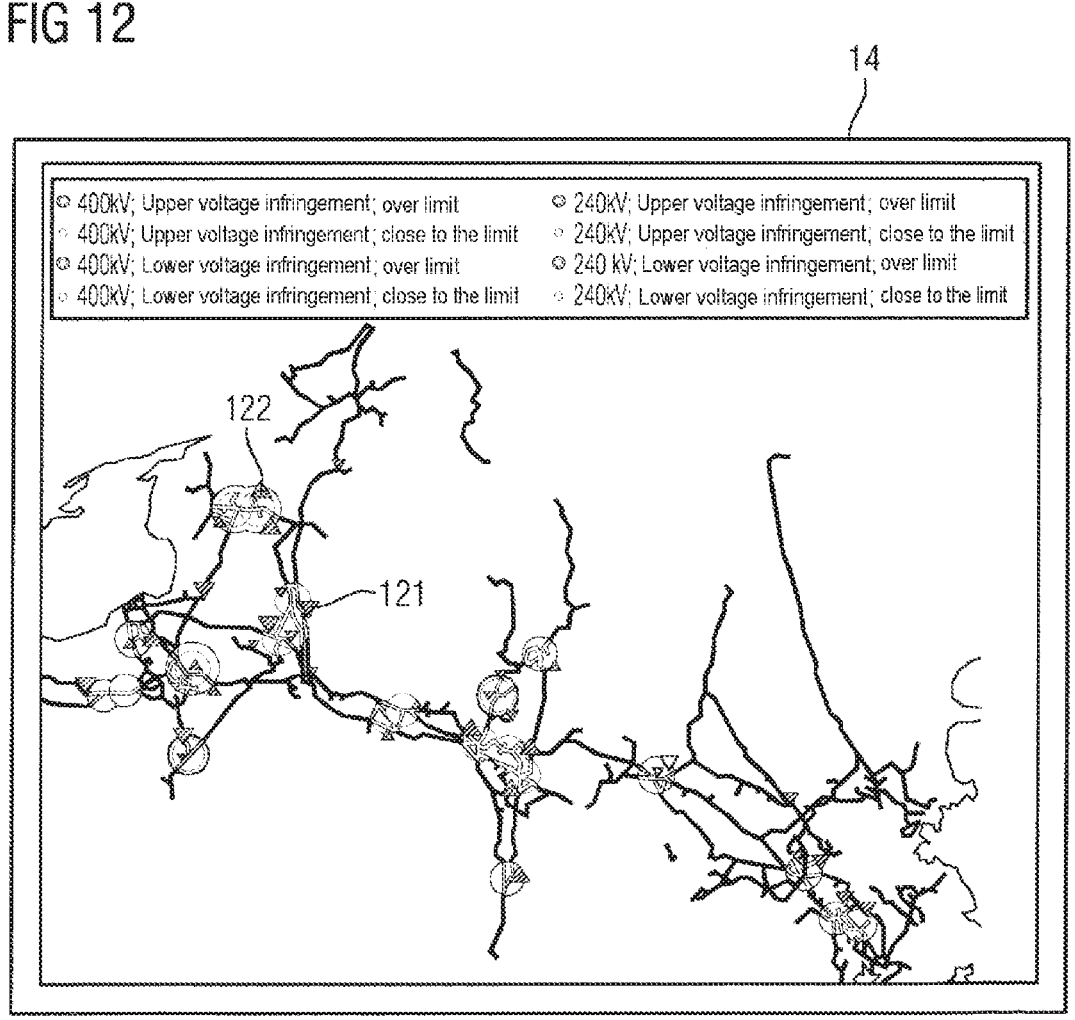
FIG. 12 shows a third exemplary embodiment of a visual display of a state of a power supply system with graphical representations of critical system states and a graphical presentation of reserve values indicating a control reserve.

Finally, FIG. 12 shows a third exemplary embodiment of the display of a state of the electrical power supply system with the display device 14.

In the example of FIG. 12, besides the already described graphical representations of critical system states, reserve values are also presented that indicate an inductive and/or capacitive control reserve in the power supply system. In FIG. 12, these are graphically presented, merely by way of example, as triangles 121 and 122, with the orientation of the triangle indicating the type of control reserve (inductive or capacitive). By way of example, an upwardly directed triangle 122 indicates an inductive control reserve and a downwardly directed triangle 121 indicates a capacitive control reserve. In this case, the display of the reserve values can take place on the same display level as the display of the graphical representations or on one or more other display level(s) ("layer"). The additional display of the reserve values provides the operating personnel with valuable pointers to possible scopes of action in order to correct an (imminent) threshold value violation.

In this case, the reserve values can be displayed either in the two-dimensional presentation (as shown in FIG. 12) on in the three-dimensional presentation.

The types of visual presentation that are described in FIGS. 2 to 12 can optionally be supported by further interaction options for the operating personnel: by way of example, individual voltage levels can be shown and hidden, so that particular relationships for a system state can easily be identified. All or selected visualizations of graphical representations and, if need be, reserve values can be shown and hidden. The type of presentation of the network topology in the background can be adjusted (more conspicuous or less conspicuous). It is possible to navigate within the visual display using standard navigation mechanisms (such as zooming and moving). A change from the 2D view to the 3D view and vice versa can take place. By direct clicking on the graphical representations and, if need be, the reserve values, it is possible for relevant detailed information (e.g. detailed values of the associated measured values, state values and state threshold values) to be displayed.

The invention claimed is:

1. A method of monitoring an installation having a network topology, the method comprising:
acquiring at a plurality of measuring points of the installation, measured values characterizing a state of the installation at the respective measuring point;
obtaining, based on the measured values, state values that indicate a state at prescribed state observation points of the installation, wherein a number of the prescribed state observation points of the installation is larger than a number of the plurality of measuring points of the installation;

providing state threshold values for at least selected instances of the state observation points, the state threshold values delimiting an admissible operating area for the installation and the respective state observation point;

comparing the state values ascertained for the selected state observation points with the associated state threshold values;

producing a graphical representation exclusively for those state values for which a violation of the associated state threshold value has already taken place or is imminent;

generating the graphical representation with a circular or elliptical base area having a diameter dependent on a magnitude of the respective state value in comparison with the associated state threshold value;

producing a visual display of a network topology of the installation and displaying same on a display device;

assigning to at least the state values for which a graphical representation is produced a respective item of location information indicating a position of their respective state observation point in the installation;

displaying the respective graphical representation, using the location information, at that respective point of the displayed network topology that corresponds to a position thereof in the installation; and correcting the violation of the associated state threshold value.

2. The method according to claim 1, wherein the installation is selected from the group consisting of:
an electrical power supply system;
a pneumatic network;
a hydraulic network;
a data network;
an information network;
a communication network; and
a transportation network.

3. The method according to claim 2, wherein the installation is
a pneumatic network being a gas or air distribution network;
a hydraulic network being a water or oil distribution network, or
a transport network being a road transport network or a rail network.

4. The method according to claim 1, which comprises forming the state values directly from the measured values or ascertaining the state values by carrying out a state estimation method, a load flow computation method, a load flow forecast method or a combination thereof.

5. The method according to claim 1, which comprises indicating the value of the respective state threshold value by the graphical representation.

6. The method according to claim 1, which comprises displaying the graphical representation as a three-dimensional body when a threshold value violation has taken place.

7. The method according to claim 6, wherein the three-dimensional body also displays a direction of the threshold value violation.

8. The method according to claim 6, wherein a length of a height axis of the graphical representation is dependent on a magnitude of the respective state value in comparison with the associated state threshold value.

9. The method according to claim 1, wherein one or both of a coloration or a transparency of the graphical representation is dependent on the magnitude of the respective state value in comparison with the associated state threshold value and/or dependent on an association of the graphical representation with a particular group of the respective associated observation point in the installation.

10. The method according to claim 1, which further comprises:
ascertaining reserve values that indicate a control reserve in the installation; and
presenting the value of the reserve values by taking account of its position in the installation, together with the network topology.

11. The method according to claim 10, wherein the installation is an electrical power supply system and the reserve values indicate an inductive and/or capacitive control reserve.

* * * * *